Patented Dec. 29, 1953

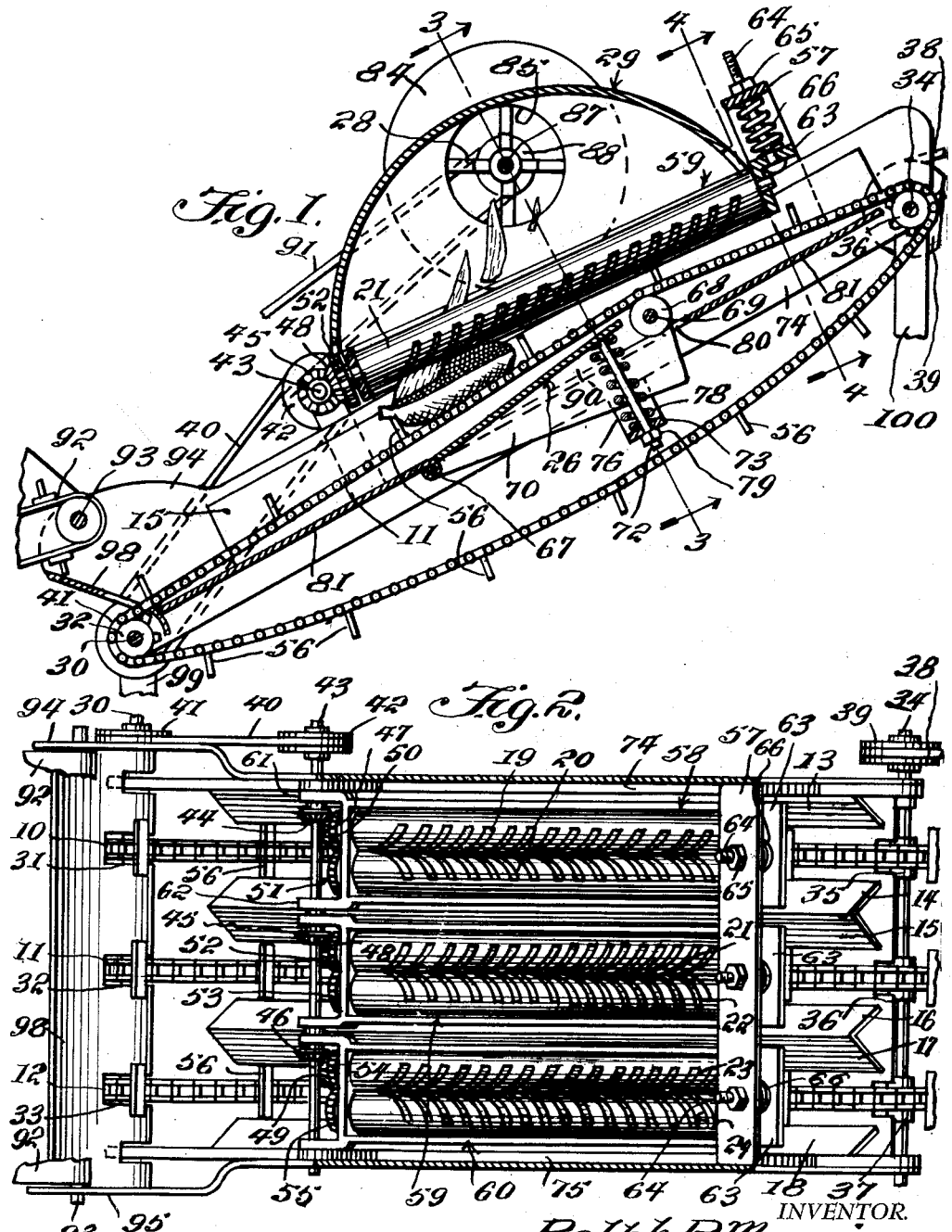

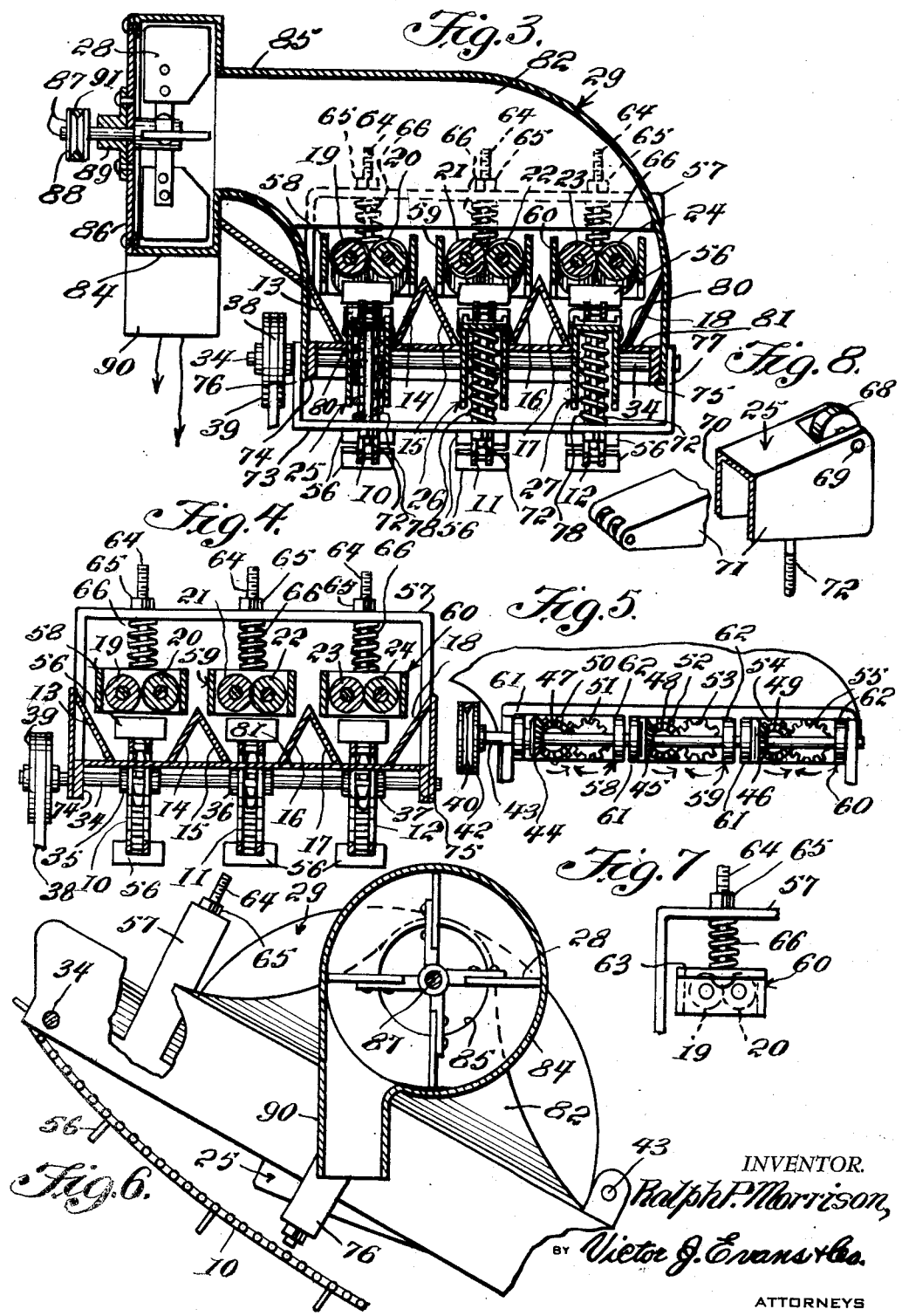

2,664,090

UNITED STATES PATENT OFFICE 2,664,090

VACUUM CORN HUSKING UNIT

Ralph P. Morrison, Callaway, Nebr.

Application August 3, 1950, Serial No. 177,533

2 Claims. (Cl. 130—5)

1

This invention relates to a corn husking unit of the type used in combination with a corn picker, and in particular this invention relates to a husking unit that husks and cleans the corn in one operation with broken stalks and husks removed in the same operation and that husks the corn in a dry state.

The purpose of this invention is to provide an improved corn husking unit that is substantially open whereby the parts will not clog up with broken stalks, husks and the like, such as is true of conventional corn husking machines.

Because of the different sizes of the ears of dry corn it is difficult to hold the ears continuously in contact with husking rolls so that it is difficult to remove all of the husk without damaging the grain. With this thought in mind this invention contemplates a husking unit in which ears of corn are held in contact with husking rolls by a yielding element and in which the husking rolls are also resiliently mounted whereby the rolls coact with the yielding element to retain ears of corn of different sizes in positive contact with husking rolls.

The object of this invention is, therefore, to provide means for constructing a corn husking unit wherein ears of corn are conveyed against pairs of husking rolls whereby the conveying means and rolls are yieldingly supported.

Another object of the invention is to provide an improved corn husking unit that may be used in combination with corn pickers and the like now in use.

A further object of the invention is to provide an improved corn husking unit which is of a simple and economical construction.

With these and other objects and advantages in view the invention embodies a plurality of spaced parallel conveyor chains having flights thereon with V-shaped panels positioned between the chains and formed with outwardly diverging sections providing troughs, pairs of husking rolls positioned against each conveyor chain, suction means for circulating air through the chains and rolls and resilient means supporting sections of the chains and the upper ends of the husking rolls.

Other features and advantages of the invention will appear from the following description taken in connection with the drawings wherein:

Figure 1 is a longitudinal section through one of the husking units illustrating an ear of corn conveyed by one of the chains and passing between a pair of husking rolls.

Figure 2 is a plan view of the husking unit.

Figure 3 is a cross section through the husking unit taken on line 3—3 of Figure 1.

Figure 4 is a similar section taken on line 4—4 of Figure 1.

2

Figure 5 is a similar section illustrating the gears at the ends of the husking rolls.

Figure 6 is a detail showing a side elevational view of part of the unit with the blower for providing the suction through the unit shown in section and with parts broken away.

Figure 7 is a detail looking toward the upper end of one of the pairs of husking rolls illustrating the resilient mounting means of the rolls.

Figure 8 is a detail illustrating one of the yielding conveyor mounting elements for urging the chains upwardly toward the husk rolls.

Referring now to the drawings wherein like reference characters denote corresponding parts the improved husking unit of this invention includes a plurality of conveyor chains 10, 11 and 12, a trough having inclined side panels 13 and 14 positioned to coact with the chain 10, another trough having inclined side panels 15 and 16 positioned to coact with the chain 11, a similar trough having inclined side panels 17 and 18 positioned to coact with the chain 12, husking rolls 19 and 20 positioned above the chain 10, 21 and 22 positioned above the chain 11 and 23 and 24 positioned above the chain 12, yielding segments 25, 26 and 27 positioned below the chains and a blower 28 positioned at the end of a hood 29 for drawing air through the chains and husking rolls.

The conveyor chains are mounted on a shaft 30 through sprockets 31, 32 and 33 at the lower end of the unit and on a similar shaft 34 at the upper end of the unit by sprockets 35, 36 and 37.

The conveyor chains are driven through the shaft 34 at the upper end by a belt or chain 38 on a pulley or sprocket 39.

The husking rolls are driven from the shaft 30 by a belt 40 that is trained over pulleys 41 and 42 and the pulley 42, which is positioned on a shaft 43 rotates the shaft 43 with bevel gears 44, 45 and 46 on the shaft meshing with corresponding gears 47, 48 and 49, respectively.

The husking rolls 19 and 20 are provided with meshing spur gears 50 and 51, the rolls 21 and 22 are provided with similar gears 52 and 53 and the rolls 23 and 24 with similar gears 54 and 55, respectively.

The conveyor chains are provided with flights 56 that carry ears of corn, as illustrated in Figure 1 upwardly through the units.

Each pair of husking rolls is mounted in a separate and independent frame and the lower ends of the frames are pivotally mounted on the shaft 43 with the upper ends resiliently suspended from a yoke 57. The frames in which the husking rolls are journaled are rectangular shaped having side and end bars. Husking rolls 19 and 20 are journaled in a frame 58, the rolls 21 and 22 in a frame 59 and the rolls 23 and 24 in a frame 60. The frame 58 is provided with extensions 61 and 62 at the lower end through which it is pivotally mounted on the shaft 43, and an extension 63 at the upper end through which it is suspended from the yoke 57 by a bolt 64 with a nut 65 threaded on the upper end of the bolt and with a spring 66 positioned around the bolt and between the extensions 63 and the cross bar of the yoke 57. The frames 59 and 60 are formed with similar parts and these frames are mounted in a similar manner.

The segments 25, 26 and 27 are similar and each is pivotally mounted on a pin 67 and provided with a roller 68 that is positioned below the upper strand of the conveyor chains. The rollers are mounted on shafts 69 between side panels 70 and 71 and studs 72 extended downwardly from the segments extended through a cross bar 73 that is suspended from side bars 74 and 75 by upwardly extended ends 76 and 77. The segments are resiliently held upwardly by springs 78 and the lower ends of the studs 72 are provided with nuts 79 that are adjusted to limit upward movement of the segments.

The segments are positioned in openings 80 in an apron or plate 81 that is positioned on the upper edges of the side bars 74 and 75 and upon which the upwardly diverging panels of the trough are positioned.

The hood 29 is provided with side walls 82 and 83 that are secured to the outer surfaces of the side bars 74 and 75 and the blower 28 is positioned in a housing 84 positioned at one side of the hood, the housing being connected to the hood by a neck 85.

The outer end of the housing 84 is provided with a cover plate 86 and the blower shaft 87, which is provided with a pulley 88 is journaled in a bearing 89 on the cover plate. The blower housing is provided with a discharge chute 90, as shown in Figure 6.

The blower 28 is actuated by any suitable power means through a belt 91 and ears of corn are supplied to the husking unit by a suitable feeder conveyor 92 having a shaft 93 that is journaled between wings 94 and 95 that are extended from side plates 96 and 97, respectively of the unit as shown in Figure 2. A plate 98 connects the lower edges of the wings 94 and 95 providing a chute by which ears of corn are fed to the husking conveyors and rolls.

The units, particularly as illustrated in Figures 1, 2 and 3 may be mounted in a suitable frame having uprights 99 and 100 and the feeding conveyor 92 may extend from a corn picker or any suitable implement or device.

With the parts arranged in this manner ears of corn supplied to the conveyors 10, 11 and 12 are positioned by the inclined panels whereby they assume longitudinal positions, as illustrated in Figure 1, as they are conveyed upwardly and as they engage the husking rolls they are rotated on the chains as the husks are removed. The husks, broken stalks, and the like are drawn upwardly by the blower as they are released from the ears of corn and husked and cleaned ears of corn are delivered from the upper ends of the conveyor chains.

It will be understood that modifications may be made in the design and arrangement of the parts without departing from the spirit of the invention.

What is claimed is:
1. A corn husking unit comprising spaced parallel conveyors having flights thereon, shafts with wheels thereon for mounting said conveyors with the conveyors in upwardly inclined positions and with the lower ends of the conveyors positioned to receive products, the upper ends of said conveyors being positioned to discharge the products, a pair of husking rolls positioned above and parallel to each of said conveyors, means for pivotally mounting the ends of the said husking rolls at the receiving ends of the conveyors, resilient means supporting the ends of the husking rolls at the discharge ends of the conveyors with the said rolls inclined in relation to the conveyors wherein the distance between the ends of the rolls and conveyors at the discharge ends of the conveyors is less than the distance between the ends of the rolls and conveyors at the receiving ends of the conveyors, idler rollers positioned against the under surfaces of the conveyors, means resiliently urging the said idler rollers with the conveyors thereon upwardly toward the husking rolls, a plurality of troughs with upwardly extended and outwardly diverging sides positioned to coact with the conveyors and husking rolls, a hood positioned over the said husking rolls, and a blower extended from one end of the hood for exhausting air from said hood.

2. A corn husking unit comprising spaced parallel conveyors having flights thereon, shafts with wheels thereon for mounting said conveyors with the conveyors in upwardly inclined positions and with the lower ends of the conveyors positioned to receive products, the upper ends of said conveyors being positioned to discharge the products, a pair of spaced husking rolls positioned above and parallel to each of said conveyors, frames in which the pairs of husking rolls are journaled, means whereby the frames in which the husking rolls are journaled are pivotally mounted, means resiliently supporting the ends of the frames extended toward the discharge ends of the conveyors and in which the husking rolls are positioned with the said rolls inclined in relation to the conveyors wherein the distance between the ends of the rolls and conveyors at the discharge ends of the conveyors is less than the distance between the ends of the rolls and conveyors at the receiving ends of the conveyors, idler rollers positioned against the under surfaces of the conveyors, means for resiliently urging the said rollers with the conveyors thereon upwardly toward the husking rolls, troughs with upwardly extended and outwardly diverging sides positioned to coact with the conveyors and husking rolls, a hood positioned over the said husking rolls, and a blower extended from one end of the hood for exhausting air from said hood.

RALPH P. MORRISON.

References Cited in the file of this patent
UNITED STATES PATENTS

| Number | Name | Date |
|---|---|---|
| 433,133 | McDonald | July 29, 1890 |
| 584,889 | Packer | June 22, 1897 |
| 768,166 | Barnard | Aug. 23, 1904 |
| 770,639 | Hidy | Sept. 20, 1904 |
| 822,187 | Conover | May 29, 1906 |
| 1,379,055 | Smith | May 24, 1921 |
| 1,898,757 | Bockmann | Feb. 21, 1933 |
| 2,217,945 | Digre | Oct. 15, 1940 |
| 2,550,785 | Crosset | May 1, 1951 |

FOREIGN PATENTS

| Number | Country | Date |
|---|---|---|
| 629,943 | Great Britain | Sept. 30, 1949 |